United States Patent [19]

Fujiwara et al.

[11] Patent Number: 4,734,303

[45] Date of Patent: Mar. 29, 1988

[54] DEEP-DRAW-FORMED VESSEL AND PROCESS FOR PREPARATION THEREOF

[75] Inventors: Tamio Fujiwara; Kazumi Hirota, both of Tokyo; Hiroshi Matsubayashi, Kamakura; Tadahiko Katsura, Yokohama, all of Japan

[73] Assignee: Toyo Seikan Kaisha, Ltd., Tokyo, Japan

[21] Appl. No.: 886,741

[22] Filed: Jul. 18, 1986

[30] Foreign Application Priority Data

Jul. 19, 1985 [JP] Japan ................................. 60-158028
Oct. 8, 1985 [JP] Japan ................................. 60-222743

[51] Int. Cl.⁴ ...................... B27N 5/02; B21C 37/00; B21B 45/00
[52] U.S. Cl. ...................... 428/35; 428/606; 428/607; 220/457; 72/46; 72/47
[58] Field of Search ................. 428/35, 606, 607, 209; 220/457; 72/46, 47

[56] References Cited

U.S. PATENT DOCUMENTS 4,284,731 8/1981 Moser et al. ...................... 525/28

FOREIGN PATENT DOCUMENTS 712885 7/1965 Canada.
2551630 4/1977 Fed. Rep. of Germany.
0110080 8/1979 Japan.
0603444 8/1978 Switzerland.

Primary Examiner—John E. Kittle
Assistant Examiner—Patrick J. Ryan
Attorney, Agent, or Firm—Sherman and Shalloway

[57] ABSTRACT

A deep-draw-formed vessel which is prepared by deep-draw-forming a laminate comprising a steel or iron foil and a plastic film formed on each surface of the steel or iron foil through a layer of an adhesive having an adhesive force of at least 600 g/15 mm of width and an elastic modulus of 50 to 10,000.

A Kg/cm² inorganic filler such as titanium dioxide is preferably incorporated in the plastic film so as to improve the deep-drawability.

22 Claims, 6 Drawing Figures

DEEP-DRAW-FORMED VESSEL AND PROCESS FOR PREPARATION THEREOF

BACKGROUND OF THE INVENTION (1) Field of the Invention

The present invention relates to a deep-draw-formed vessel prepared from a laminate of an iron or steel foil and a plastic material. More particularly, the present invention relates to a deep-draw-formed vessel excellent in corrosion resistance, shape-retaining property and easy disposability. Furthermore, the present invention relates to an improvement of the deep-drawability of a laminate comprising an iron or steel foil and a resin film.

(2) Description of the Prior Art

As the packaging material for a vessel or lid, there have been used various single materials such as metals, plastics, paper, glass and ceramics, and composite materials comprising at least two of these single materials. However, in view of the combination of the barrier property to gases such as oxygen, carbon dioxide gas and steam and the mechanical strength, metal materials are most preferred.

In case of a metal can or metal lid, there arises a problem of so-called can pollution because disposal is impossible by incineration. Accordingly, as a packaging material having an easy disposability, a laminate comprising a metal foil and a resin film is widely used in the field of sealed vessels or sealed lids. Almost all of commercially available laminates for vessels or lids comprise an aluminum foil as the substrate. Although an aluminum foil is excellent in appearance characteristics and flexibility, even in the state covered with an organic resin, troubles such as corrosion, i.e., pitting, and peeling of the covering layer are caused by a content containing a salt such as sodium chloride at a high concentration or a content containing an organic acid, and such defects as leakage the content and reduction of the preserving property are brought about.

As the metal foil, there also are known foils composed mainly of iron or steel, such as an iron foil, a steel foil and a tinplate foil. However, use of these foils as the packaging material involves problems to be solved. Namely, rusting is readily caused in iron and steel, and during the preparation of a packaged article or during the storage, rusting is caused and drastic reduction of the appearance characteristics or commercial value often occurs. Furthermore, dissolution of iron or incorporation of rust results in drastic reduction of the property of retaining the flavor of the content.

In a vessel obtained by deep-draw-forming a laminate comprising a steel or iron foil or the like and a resin film, even if the steel or iron foil or the like is covered with the resin film on the inner face side, peeling is readily caused between the resin film layer on the inner face side and the steel or iron foil, and even when peeling is not caused after the forming operation, peeling is caused at the time of retort sterilization or during the subsequent storage, a so-called blister is formed in this peeled portion and corrosion or dissolution of iron is caused from this blister.

Furthermore, since the thickness of an iron foil or steel foil is smaller than the thickness of a steel plate, the iron or steel foil is poor in drawability and formability, and during the draw-forming operation, the foil is wrinkled or broken and it is impossible to form a vessel. This defect becomes conspicuous when an organic resin covering layer having a relatively large thickness is applied to the iron or steel foil so as to improve the corrosion resistance or rust resistance of the foil.

SUMMARY OF THE INVENTION

It is therefore a primary object of the present invention to provide a vessel prepared by deep-draw-forming a laminate of a steel or iron foil and a plastic film, in which peeling between the steel or iron foil and the film is prevented not only after the formation but also at the retort sterilization or during the subsequent storage.

Another object of the present invention is to provide a deep-draw-formed vessel of a laminate of a steel or iron foil and a plastic film, which is excellent in the combination of corrosion resistance, shape-retaining property and easy disposability.

Still another object of the present invention is to provide a process for preparing a faultless and excellent deep-draw-formed vessel as mentioned above from a steel or iron foil.

A further object of the present invention is to provide a process for deep-draw-forming a steel or iron foil into a vessel, in which wrinkling or breaking (edge cutting) is effectively prevented.

A still further object of the present invention is to provide a deep-draw-formed vessel of a steel or iron foil in which rusting or dissolution of iron is effectively prevented and the commercial value is increased.

It was found that the foregoing objects can be attained by deep-draw-forming a laminate comprising a steel or iron foil and a plastic film laminated on each surface of the steel or iron foil through a layer of an adhesive having an adhesive force of at least 600 g/15 mm of width and an elastic modulus of 50 to 10000 $kg/cm^2$.

It also was found that if a laminate comprising a steel or iron foil and thermoplastic resin films covering both the surfaces of the steel or iron foil, in which an inorganic filler is incorporated at least in the film layer to be located on the inner side of a final vessel, is draw-formed, the deep-drawability is prominently improved over the deep-drawability of a laminate in which the inorganic filler is not incorporated.

We have now completed the present invention based on these findings.

More specifically, in accordance with one fundamental aspect of the present invention, there is provided a deep-draw-formed vessel which is prepared by deep-draw-forming a laminate comprising a steel or iron foil and a plastic film formed on each surface of the steel or iron foil through a layer of an adhesive having an adhesive force of at least 600 g/15 mm of width and an elastic modulus of 50 to 10000 $kg/cm^2$.

In accordance with another aspect of the present invention, there is provided a process for the preparation of deep-draw-formed vessels, which comprises deep-draw-forming a laminate comprising a steel or iron foil and thermoplastic films covering both the surfaces of the steel or iron foil, wherein an inorganic filler is incorporated at least in the film layer to be located on the inner face side of a final vessel.

Figure 1:
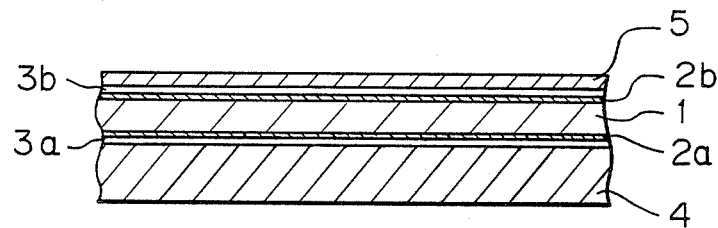
FIG. 1 is a sectional view showing a laminate used in the present invention.

In the drawings, reference numeral 1 represents a steel foil as the substrate, reference numerals 2a and 2b represent a surface-treated layer, reference numerals 3a and 3b represent an adhesive layer, reference numeral 4 represents a thermoplastic resin film on the inner face side, especially an inorganic filler-incorporated resin film, reference numeral 5 represents a thermoplastic resin film on the outer face side, reference numeral 10 represents a laminate, reference numeral 11 represents a blank holder, reference numeral 12 represents a punch, reference numeral 13 represents a die, reference numeral 14 represents a metal core of the punch, reference numeral 15 represents a rubber, reference numeral 20 represents a total vessel, reference numeral 21 represents a bottom of the vessel, reference numeral 22 represents a side wall, reference numeral 23 represents a flange, reference numeral 24 represents a cut edge, and reference numeral 25 represents a curled portion.

DETAILED DESCRIPTION OF THE PREFERRED EMBODIMENTS

Generally, in the deep-draw-forming operation, deformation of the material is relatively small in a portion corresponding to a bottom of a final vessel, but flow of the material is gradually increased from the lower portion of the upper portion in the side face of the vessel and the flow quantity is extremely large in the vicinity of the top end portion. Also in a laminate of a steel or iron foil and a plastic film, the tendency of the plastic flow is the same as described above. However, since the steel or iron foil is different from the plastic film in the response to stress-deformation at the processing step, internal stress or strain is left in the interface between them after the deep-draw-forming operation, and it is considered that this internal stress or strain causes interlaminar peeling between them.

The present invention is based on the finding that if an adhesive having an adhesive force of at least 600 g/15 mm of width, especially at least 1000 g/15 mm of width, and an elastic modulus of 50 to 10000 kg/cm$^2$, especially 200 to 9000 kg/cm$^2$, as measured at room temperature is used as the adhesive to be interposed between the steel or iron foil and the plastic film, the above-mentioned interlaminar peeling after the deep-draw-forming operation is effectively prevented. Incidentally, the adhesive force and elastic modulus referred to herein are values determined according to methods described below.

At the deep-draw-forming operation, in the portion corresponding to the side face of a final vessel, the plastic film layer should flow according as the flow of the surface of the steel or iron foil. For this purpose, the adhesive layer used in the present invention should exert an adhesive force of at least 600 g/15 mm of width to the combination of the steel or iron foil and the plastic film. If the adhesive force is smaller than the above-mentioned lower limit value, deep-draw forming per se becomes difficult, or even if deep-draw forming is possible, peeling is caused by the internal stress left in the surface of the plastic film during the retort sterilization or storage after the deep-draw-forming operation.

It was found that also the elastic modulus of the adhesive has serious influences on the peeling tendency after deep-draw forming of a laminate of a steel or iron foil and a plastic film. Namely, deformation of the plastic film caused by deep-draw forming in the side face portion of a vessel comprises substantially expansion in the axial direction of the vessel and compression deformation in the circumferential direction of the vessel. Accordingly, the plastic film on the surface of the vessel has an internal stress moderating these deformations. If the elastic modulus is too low and below the above-mentioned range, bonding cannot resist the above-mentioned internal stress and peeling is caused between the steel or iron foil and the plastic film. If the elastic modulus is too high and exceeds the range specified in the present invention, fracture is caused in the adhesive layer at the stage of plastic deformation during the forming operation, resulting in occurrence of interlaminar peeling. In the present invention, by adjusting the elastic modulus of the adhesive layer within the above-mentioned range, fracture of the adhesive layer at the stage of plastic deformation during the forming operation is prevented, and simultaneously, bonding can resist the internal stress left on the surface of the plastic film after the forming operation and interlaminar peeling between the steel or iron foil and the plastic film can be effectively prevented.

According to the present invention, by thus enhancing the adhesion of the plastic film to the steel or iron foil, occurrence of such troubles as rusting, pitting and dissolution of iron into the content can be completely prevented. Furthermore, since the steel or iron foil has a higher corrosion resistance to salts than an aluminum foil, it will be readily understood that there can be provided a sealed packaging vessel having a good preserving property to many foods containing salts.

Moreover, since the rigidity of the steel or iron foil is higher than foils of other metals, it will be understood that there can be provided a light-weight vessel excellent in the shape-retaining property. Since the steel or iron foil copy in the present invention has ordinarily a thickness smaller than 100 $\mu$m, the steel or iron foil is light in the weight and can be easily crushed and can also be easily ashed (oxidized to iron oxide) by incineration. Accordingly, the formed vessel is easily disposable.

The steel or iron foil used in the present invention may have a surface-treated layer on the surface thereof. This surface-treated layer may be a known surface-treated layer formed by a deposition treatment, an electrolytic treatment, a formation treatment or a chemical treatment, as described hereinafter. For formation of the thermoplastic film used as the covering layer, any of materials having a film-forming property and a water resistance can be used, as described in detail hereinafter. Any of inorganic pigments and inorganic extender pigments can be used as the inorganic filler.

The present invention is further characterized in that in draw-forming a steel or iron foil, it is used in the form of a laminate comprising thermoplastic resin films laminated on both the surfaces and an inorganic filler is incorporated in the film layer located on the inner face side of a final vessel. By forming the inorganic filler-incorporated film layer on the surface top be located on the inner face side of a final vessel, the deep-drawability is highly improved and occurrence of troubles such as wrinkling and edge cutting is prevented, and as shown in the examples given hereinafter, the critical draw ratio can be prominently improved.

The draw ratio R is expressed by the formula of $R = D/d$ in which D stands for the diameter of the material to be draw-formed and d stands for the diameter of the punch (the diameter of the bottom of a formed vessel). If this value is increased, draw-forming becomes impossible at a certain value because of fracture. The maximum value of R at which draw-forming is possible is called "critical draw ratio". The larger is the critical draw ratio, more larger is the draw-forming depth.

Because of an insufficient thickness effect, an iron or steel foil is much inferior to a steel plate in the deep-drawability and formability. The reason is that wrinkles are formed during the draw-forming operation even if the blank holding force is increased so as to prevent formation of wrinkles, the blank holding force is not sufficiently transferred to the foil surface through an organic covering. Furthermore, if the blank holding force is excessively increased, formation of a vessel becomes impossible because the strength of the iron or steel foil is small.

The inorganic filler in the organic resin covering hardens the organic resin covering and if the organic filler is incorporated in the organic resin covering, the blank holding force is efficiently transferred to the foil and therefore, it is considered that a wrinkle-free draw-formed vessel can be conveniently prepared.

Moreover, by using the inorganic filler-incorporated covering, corrosion of the iron or steel foil by a corrosive component can be greatly controlled and for example, formation of hydrogen is substantially controlled. Accordingly, the shelf life of a formed vessel is considerably prolonged and even if rusting is caused in the iron or steel foil during long-period storage, the rust is hidden and a good appearance characteristic can be maintained for a long time, with the result that the commercial value is increased.

LAMINATE

Referring to FIG. 1 illustrating an example of the laminate used in the present invention, surface-treated layers 2a and 2b are formed on both the surfaces of a steel foil substrate 1, and if necessary, a thermoplastic resin film inner face layer 4 is formed on the inner face side (the lower side in FIG. 1) of a final vessel through an adhesive layer 3a. On the outer face side of the final vessel, a thermoplastic film outer face layer 5 is formed through an adhesive layer 3b, if necessary. In view of the processability of the laminate, it is preferred that an inorganic filler be incorporated at least in the resin film inner face layer 4, especially in both the film layers 4 and 5.

STEEL OR IRON FOIL

The reason why a steel or iron foil is used in the present invention is that the pitting speed of the steel or iron foil to a content containing sodium chloride or the like is much lower than that of an aluminum foil. Accordingly, the corrosion resistance and gas barrier property of the resulting vessel can be prominently improved. The steel or iron foil has a Young's modulus about 2.5 times the Young's modulus of the aluminum foil, and therefore, satisfactory strength and shape-retaining property can be obtained with a relatively small thickness. Furthermore, the steel or iron foil is cheaper than the aluminum foil and the cost of a packaging material can be reduced.

It is important that the steel or iron foil should have a thickness of 10 to 120 μm, especially 30 to 100 μm. If the thickness is smaller than 10 μm, it is difficult to obtain a foil free of defects such as pinholes, and a good barrier property to gases and steam can hardly be obtained. If the thickness is larger than 120 μm, the final vessel is too rigid and the disposal becomes difficult, or economical advantages are lost.

In the case where a softness or flexibility is required for the foil substrate, an iron foil is used, and in the case where a rigidity or mechanical strength sufficiently to retain the shape is required, a steel foil is used.

The iron foil is prepared by depositing iron on the surface of a metal substrate as the cathode from an electrolyte containing as the main contituent ferric chloride, ferric sulfate or the like and peeling the formed film from the surface of the substrate. The purity of the iron foil is very high (an Fe content of 99.97% or more) and the corrosion resistance is excellent, and the iron foil is ductile as compared with the steel foil. The iron foil has a columnar crystal structure in which crystals grow in the thickness direction, while the steel foil has a structure in which crystal grains are elongated in the rolling direction.

Either a ductile steel foil or a full-hard steel foil can be formed. The former steel foil can be obtained by annealing a cold-rolled steel plate, subjecting it to secondary cold rolling, annealing it again and, if necessary, subjecting the resulting foil to at least one post treatment selected from zinc deposition, tin deposition, nickel deposition, electrolytic chromate treatment and chromate treatment. The latter steel foil is prepared by subjecting a cold-rolled steel plate to annealing and secondary cold rolling and, if necessary, subjecting the formed foil to at least one post treatment selected from zinc deposition, tin deposition, nickel deposition, electrolytic chromate treatment and chromate treatment. A full-hard steel provided with a metal plating layer can be prepared by annealing a cold-rolled steel plate, subjecting it to the temper treatment, depositing a metal on the surface and subjecting the metal-deposited steel plate to secondary cold rolling.

Examples of the mechanical properties of ductile steel foil, full-hard steel foil and iron foil are described below.

Generally, the ductile steel foil has a tensile strength of 30 to 50 kg/mm$^2$ and an elongation of 15 to 35%, the full-hard iron foil has a tensile strength of 40 to 60 kg/mm$^2$ and an elongation of 1 to 15%, and the iron foil has a tensile strength of 30 to 50 kg/mm$^2$ and an elongation of 2 to 10%. It is ordinarily preferred that a steel foil be used.

In the present invention, in view of the corrosion resistance and the adhesion of the organic resin covering, it is preferred that a surface-treated layer comprising a metal plating layer or a metal plating layer and a chromate layer formed thereon be formed on the iron or steel foil. The organic resin covering is effective for preventing direct contact between the content and the iron or steel foil, but the organic resin covering allows considerable permeation of hydrogen ions from an organic acid or the like contained in a highly corrosive content and slight permeation of anions contained in salts, such as chloride ions. Accordingly, peeling of the organic resin covering is readily caused in the interface between the organic resin covering and the foil, and once this peeling is caused, rusting, dissolution of iron or corrosion such as pitting is easily advanced from the peeled portion.

In accordance with this preferred embodiment, by forming a surface-treated layer comprising a metal plating layer or a metal plating layer and a chromate layer formed thereon on the iron or steel foil, the metal plating layer acts as a barrier layer to the above-mentioned corrosive components and the metal plating layer enhances the adhesion between the iron or steel foil and the organic resin covering layer. If a chromate layer is formed on the metal plating layer, this adhesion is further improved.

Metals which are more ductile than iron and have an anticorrosive effect to iron, such as Ni, Sn, Zn and Al, are typically used for the metal plating layer. A plating layer composed solely of a member selected from these metals is excellent in the anticorrosive effect and has a good draw-formability, and when the iron or steel foil is cut, the metal of the plating layer flows into the cut edge portion to protect the cut edge portion and control occurrence of rusting from the cut edge portion. This is an unexpected and novel functional effect. The fact that the metal of the plating layer flows into the cut edge portion and is present on the cut edge portion in the iron or steel foil provided with the metal plating layer is confirmed by the fact that when the cut edge portion is observed by an X-ray microanalyzer, it is found that the metal of the plating layer is present in the cut edge portion.

It is preferred that the Vickers hardness Hv of the metal plating layer be lower than 500, especially lower than 400, and the amount coated of the metal be 0.1 to 15 kg/m$^2$, especially 0.2 to 12 g/m$^2$. If a metal having a hardness exceeding the above range is used, the metal of the plating layer does not flow to the cut edge portion when the iron or steel foil is cut, and an effect of preventing rusting is not attained. If the amount coated of the metal is too small and below the above-mentioned range, the barrier effect to corrosive components and the anticorrosive effect are insufficient, and the effect of preventing rusting in the cut edge portion is not attained. Use of the metal in a covered amount exceeding the above-mentioned range is economically disadvantageous and the advantages attained by use of the iron or steel foil are cancelled.

A nickel plating layer is especially excellent in the barrier effect to corrosive components, and a tin-plated iron or steel foil, that is, a tinplate foil, is easily available. In case of the tinplate foil, even if the amount covered of tin is relatively small, for example, 0.5 to 10 g/m$^2$, sufficient corrosion resistance and sufficient adhesion of the organic resin covering layer can be obtained. In this case, the tin layer may be a metallic tin layer, but in view of the adhesion of the organic resin covering layer it is preferred that the tin layer be a layer of a tin-iron alloy in which the Sn/Fe atom ratio be from 2 to 1.

As the chromate layer, there can be mentioned a chromium oxide layer composed mainly of hydrous chromium oxide in which the amount covered of Cr is 1 to 50 mg/m$^2$, especially 3 to 35 mg/m$^2$. This chromate layer is formed on the above-mentioned metal plating layer by known formation treatment and/or chemical treatment.

In the present invention, in case of a vessel in which rusting in the cut edge portion does not cause any problem, for example, a draw-formed vessel in which the end portion is curled, there may be used a tin-free steel foil comprising a metallic chromium layer as the plating layer and a chromate layer formed thereon. It is preferred that this metallic chromium layer be present in an amount covered of 0.03 to 0.5 g/m$^2$, especially 0.05 to 0.3 g/m$^2$.

The metal plating layer is not limited to a layer composed of a single metal but the layer may be composed of a plurality of metals. For example, the metal plating layer may be a composite layer comprising an underplating layer of the above-mentioned ductile metal such as nickel and a top plating layer of metallic chromium formed thereon by the electrolytic chromate treatment, and a chromium oxide layer may be further formed thereon.

PLASTIC FILM

Any of film-forming resins that can be deep-draw-formed in the form of a laminate with a steel or iron foil can be optionally used for the plastic film in the present invention. Preferred examples are described below though resins that can be used are not limited to those exemplified below.

(a) Polyolefins such as polypropylene, polyethylene, polybutene-1, a propylene/ethylene copolymer, a propylene/butene-1 copolymer, an ethylene/vinyl acetate copolymer and an ion-crosslinked olefin copolymer (ionomer).

(b) Polyamides, especially polyamides consisting of recurring units represented by the following general formula:

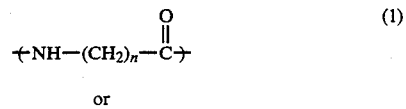

or

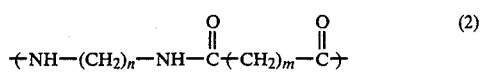

wherein n is a number of from 3 to 13 and m is a number of from 4 to 11, such as poly-ω-aminocaproic acid, poly-ω-aminohetanoic acid, poly-ω-aminocaprylic acid, poly-ω-aminopelargonic acid, poly-ω-aminodecanoic acid, poly-ω-aminoundacanoic acid, poly-ω-aminododecanoic acid, poly-ω-aminotridecanoic acid polyhexamethylene adipamide, polyhexamethylene sebacamide, polyhexamethylene dodecamide, polyhexamethylene tridecamide, polydecamethylene adipamide, polydecamethylene sebacamide, polydecamethylene dodecamide, polydecamethylene tridecamide, polydodecamethylene adipamide, polydodecamethylene sebacamide, polydodecamethylene dodecamide, polydodecamethylene tridecamide, polytridecamethylene adipamide, polytridecamethylene sebacamide, polytridecamethylene dodecamide, polytridecamethylene tridecamide, polyhexamethylene azelamide, polydecamethylene azelamide, polydodecamethylene azelamide, polytridecamethylene azelamide, and copolyamides thereof.

(c) Polyesters, especially polyesters consisting of recurring units represented by the following formula:

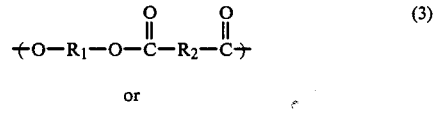

or

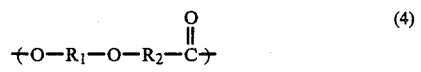

wherein $R_1$ stands for an alkylene group having 2 to 6 carbon atoms, and $R_2$ stands for an alkylene or arylene group having 2 to 24 carbon atoms, such as polyethylene terephthalate, polyethylene terephthalate/isophthalate, polytetramethylene terephthalate, polyethylene/tetramethylene terephthalate, polytetramethylene terephthalate/isophthalate, polytetramethylene/ethylene terephthalate, polyethylene/tetramethylene terephthalate/isophthalate, polyethylene hydroxybenzoate, and blends thereof.

(d) Polycarbonates, especially polycarbonates represented by the following general formula:

wherein $R_3$ stands for a hydrocarbon group having 8 to 15 carbon atoms, such as poly-p-xyleneglycol biscarbonate, polydihydroxydiphenylmethane carbonate, polydihydroxydiphenylethane carbonate, polydihydroxydiphenyl-2,2-propane carbonate and polydihydroxydiphenyl-1,1-ethane carbonate.

(e) Vinyl chloride resins such as polyvinyl chloride, a vinyl chloride/butadiene copolymer and a vinyl chloride/styrene/butadiene copolymer.

(f) Vinylidene chloride resins such as a vinyl chloride/vinylidene chloride copolymer and a vinylidene chloride/vinylpyridine copolymer.

(g) High-nitrile resins such as an acrylonitrile/butadiene copolymer, an acrylonitrile/styrene copolymer and an acrylonitrile/styrene/butadiene copolymer, each having a high nitrile content.

(h) Polystyrene resins such as a styrene/butadiene copolymer.

It is preferred that the thickness of the thermoplastic resin film be 10 to 150 μm, especially 30 to 100 μm. If the thickness is too small and below the above range, the covering effect of the resin film against corrosion is likely lost, and if the thickness is too large and exceeds the above range, the draw-formability is degraded.

In the present invention, the above-mentioned resin covering layers are formed on both the surfaces of the iron or steel foil. It is preferred that an inorganic filler be incorporated at least in the resin layer to be located on the inner face side of a final vessel, especially on both the resin layers.

As the inorganic filler, there can be mentioned inorganic white pigments such as rutile titanium dioxide, anatase titanium dioxide, zinc flower and gloss white, white extender pigments such as baryte, precipitated baryte sulfate, calcium carbonate, gypsum, precipitated silica, aerosil, talc, calcined clay, uncalcined clay, barium carbonate, alumina white, synthetic mica, natural mica, synthetic calcium silicate and magnesium carbonate, black pigments such as carbon black and magnetite, red pigments such as red iron oxide, yellow pigments such as sienna, and blue pigments such as ultramarine and cobalt blue. Of course, inorganic fillers that can be used in the present invention are not limited to those exemplified above.

In order to disperse the inorganic filler into the resin easily and uniformly, it is preferred that the average particle size of the inorganic filler be 0.05 to 20 μm, and in view of the draw-formability, it is preferred that the specific gravity of the inorganic filler be 2.0 to 9.0. In view of the hiding and barrier properties, it is preferred that the hiding power determined according to JIS K-5101 be at least 50 cm²/g.

Titanium dioxide, especially rutile titanium dioxide, is preferred as the inorganic filler for attaining the objects of the present invention. Among various pigments, this titanium dioxide shows a highest anticorrosive action against corrosion of the steel or iron foil by corrosive components, and titanium dioxide is excellent in the hiding power. Accordingly, if titanium dioxide is used, it is possible to keep a packaging vessel white permanently.

It is preferred that the inorganic filler be incorporated in an amount of 2 to 50% by weight, especially 5 to 30% by weight, based on the resin, though the preferred amount differs to some extent according to the film thickness and the like. If the amount of the inorganic filler is too small and below the above-mentioned range, the effect of controlling formation of wrinkles by increasing the rigidity of the film layer is insufficient, and the corrosion resistance and hiding effect are not satisfactory. If the amount of the inorganic filler is too large and exceeds the above-mentioned range, the resin film becomes brittle, and at the draw-forming step, pinholes or cracks are readily formed or breaking or peeling is readily caused.

ADHESIVE

The adhesive used in the present invention has the above-mentioned properties. An appropriate adhesive is selected according to the kind of the plastic film used while taking properties of the adhesive resin into consideration.

As the adhesive suitably used for attaining the objects of the present invention, there can be mentioned isocyanate type adhesives and epoxy type adhesives, especially polyester-urethane adhesives and polyester-epoxy-urethane adhesives.

As the polyester-urethane adhesive, there can be mentioned a product obtained by reacting a hydroxy-terminated polyester with a diisocyanate and crosslinking the obtained isocyanate-terminated polyester by water or a polyhydric alcohol as the crosslinking agent and a product obtained by reacting a polyhydric alcohol, a polybasic carboxylic acid and a diisocyanate and crosslinking the obtained hydroxy-terminated polyester urethane by a diisocyanate as the crosslinking agent. The latter adhesive is especially preferred.

As the polybasic carboxylic acid constituting the polyester, there can be mentioned succinic acid, adipic acid, sebacic acid and decane-carboxylic acid. As the polyhydric alcohol component, there can be mentioned ethylene glycol, propylene glycol, butane-diol, glycerol, neopentyl glycol, erythritol, sorbitol and mannitol. As the diisocyanate, there can be mentioned xylylene diisocyanate, tolylene diisocyanate, cyclohexane diisocyanate and isophorone diisocyanate.

The polyester-urethane adhesion of this type produces a strong adhesion bond, ordinarily an adhesive force of 1.4 to 1.8 kg/15 mm, between the steel or iron foil and the plastic film because of the presence of urethane groups, and since hard segments derived from the diisocyanate and soft segments derived from the polyester are present in the main chain, an elastic modulus within the above-mentioned range, especially an elastic modulus of 4000 to 9000 kg/cm², is provided.

The polyester-epoxy-urethane adhesive is a composition comprising a hydroxy-terminated polyester, an epoxy resin and a diisocyanate crosslinking agent. As the polybasic carboxylic, polyhydric alcohol and diisocyanate constituting the hydroxyl-terminated polyester, compounds described above can be used. An epoxy resin obtained by reacting bisphenol A with epichlorohydrin is used as the epoxy resin.

Because of the presence of urethane groups, the polyester-epoxy-urethane adhesive shows a high adhesive force similar to that of the above-mentioned polyester-urethane adhesive, and the elastic modulus is within a range of from 1020 to 5100 kg/cm$^2$.

Lamination and bonding of the steel or iron foil and the plastic film can be accomplished by coating a solution of the above-mentioned adhesive in an organic solvent on the surface of the steel or iron foil or the plastic film, evaporating the solvent and pressing the foil and the film. It is preferred that the amount coated of the adhesive be 4.0 to 8.0 g/m$^2$.

DRAW-FORMING

Figure 2:
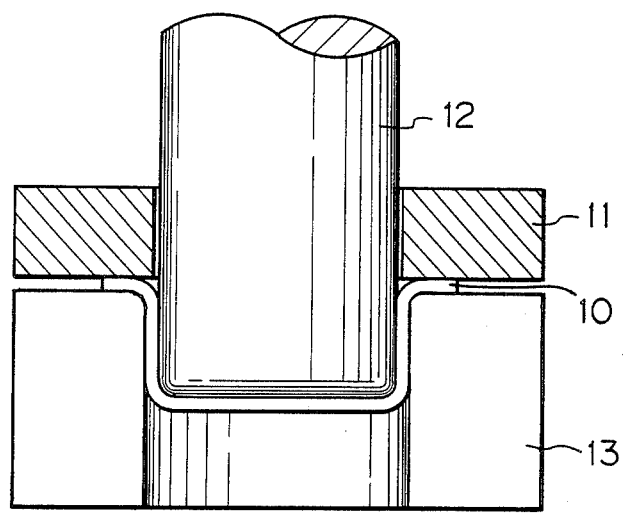
FIG. 2 is a sectional view showing a deep-draw-forming process.

In the present invention, the deep-draw-forming operation can be easily accomplished by using the above-mentioned laminate as the material. Referring to FIG. 2 illustrating the deep-draw-forming process, a blank 10 obtained by cutting the above-mentioned laminate in predetermined size and shape is subjected to press forming between punch 12 and die 13 relatively movable in the axial direction in the state where the blank 10 is held by a blank holder 11, whereby a bottomed seamless cup is obtained.

According to the present invention, deep-draw forming can be accomplished while preventing interlaminar peeling by using the above-mentioned specific adhesive and also while effectively controlling formation of wrinkles by locating the inorganic filler-incorporated film layer on the side of the blank holder, and the draw ratio defined by the above-mentioned formula of $R=D/d$ can be greatly increased by the one-staged forming operation. Namely, the critical draw ratio can be increased to about 2.4, though the critical draw ratio attainable by the conventional techniques is about 1.5 to about 2.0. One-staged forming operation is ordinarily sufficient, but if desired, the draw-forming operation may be performed in two stages or multiple stages.

Figure 3:
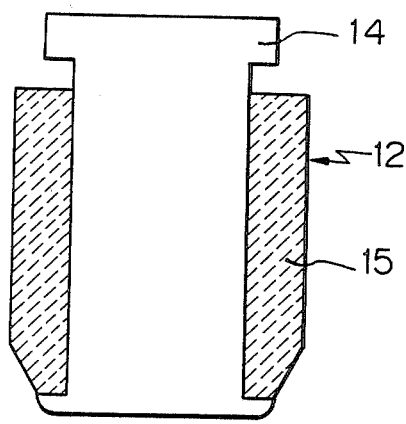
FIG. 3 is a sectional view showing a forming punch.

An ordinary metal punch can be used as the punch 12 for the draw-forming operation. However, if a punch 12' comprising a metal core 14 and a surrounding operation side wall 15 of a rubber (Japanese Pat. No. 1,130,414) as shown in FIG. 3 is used, formation of wrinkles can be further controlled.

Figure 4:
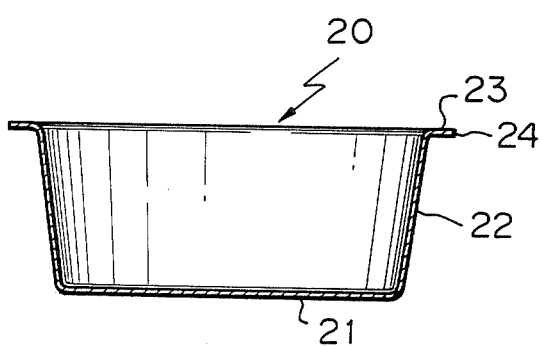
FIGS. 4, 5 and 6 are diagrams showing examples of the deep-draw-formed vessel according to the present invention.

Referring to FIG. 4 illustrating an example of the deep-draw-formed vessel according to the present invention, this vessel 20 comprises a bottom 21, a side wall 22 connected to the bottom vertically or in an upwardly expansive manner and a flange 23 formed on the top end of the side wall 22. A cut edge 24 is present on the outer side of the flange 23, but since the steel or iron foil is covered with the metal plating layer, as described hereinabove, rusting is controlled. In case of a steel or iron foil, ordinarily, this cut edge is a sharp edge and the finger or the like is easily hurt. However, in the present invention, by forming the resin covering layer having the above-mentioned thickness, the above risk can be completely obviated and a high safety is established for a packaging material including a steel or iron foil.

Figure 5:
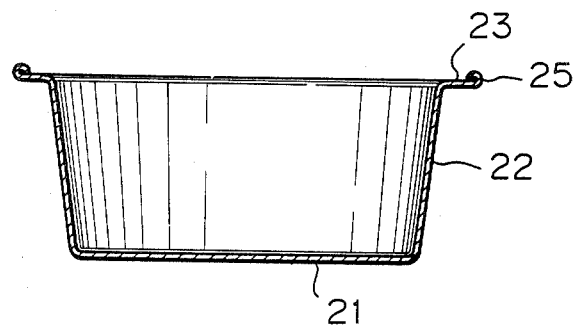
Figure 6:
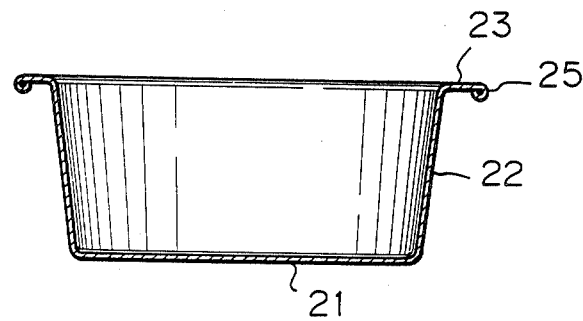

Referring to FIG. 5 showing another example of the deep-draw-formed vessel of the present invention, this vessel comprises a bottom 21, a side wall 22 and a flange 23, as well as the vessel shown in FIG. 4, but in the vessel shown in FIG. 5, a curled portion 25 is formed on the outermost edge of the flange 23 by curling the laminate. FIG. 6 illustrates another example. In the vessel shown in FIG. 6, the curled portion 25 is located at the same level as the flange 23 or at a position lower than the position of the flange 23, whereby inclusion of the content in the heat-sealed portion is prevented.

The shape of the bottomed of the vessel is not particularly critical, and any of circular, ellipsoidal, square, rectangular, hexagonal and octagonal shapes may be adopted.

If a heat-sealable resin is used as the resin for the inner face resin layer, the vessel can be easily heat-sealed with a lid member.

The present invention will now be described in detail with reference to the following examples that by no means limit the scope of the invention.

In these examples, the tests were carried out according to the following methods.

(1) Adhesive Force

A laminate was cut into a test piece having a width of 15 mm and a length of about 100 to about 150 mm and open end was slightly peeled. The test piece was set in the form of T-peel so that the test piece was peeled at an angle of 90° and the peeling force was measured at a peeling speed of 300 mm/min by a universal tensile tester.

(2) Elastic Modulus

A sample (adhesive) was coated on a Teflon plate and aged in a vacuum drier to obtain a test piece. The measurement was conducted on the test piece having a length of 3 cm, a width of 0.4 cm and a thickness of 0.01 to 0.03 cm within a measurement temperature range of from $-80°$ C. to 80° C. at a temperature-elevating speed of 3° C./min, a printing interval of 4° C. and a measurement frequency of 110 Hz by using RHEOVIBRON Model DDV-III-EA supplied by Toyo Baldwin.

(3) Draw-Formability

The critical draw ratio was determined according to the method shown in FIG. 2, and the appearance was evaluated.

(4) Deep-Draw-Formed Vessel

A cylindrical flanged deep-draw-formed cup having an opening diameter of 65 mm, a bottom diameter of 66 mm and a height of 40 mm, as shown in FIG. 5, was prepared.

(5) Retort Sterilization and Evaluation of Corrosion Resistance (5-1) Evaluation of Appearance A content was filled in a deep-draw-formed vessel, and the filled vessel was subjected to retort sterilization and stored at 37° C. for 6 months. The covering state of the plastic film and the state of the surface-treated steel foil were examined.

(5-2) Amount Generated of Hydrogen

The vessel stored in the same manner as described in (5-1) above was opened and the gas in the head space was collected on water. The amount of hydrogen in the gas was determined by gas chromatography according to the customary method. The amount of hydrogen is substantially in proportion to the amount of corrosion of the inner face of the vessel.

EXAMPLE 1

A steel foil having a thickness of 75 μm was cathodically electrolyzed in an electrolytic chromate treatment bath (aqueous solution containing 60 g/l of chromic anhydride, 0.2 g/l of sulfuric acid and 0.2 g/l of sodium silicofluoride) to form a surface-treated layer comprising 0.1 g/m$^2$ of a metallic chromium layer and 15 mg/m² of a chromate layer on each surface of the steel foil. A polyester-urethane adhesive (a) was coated on both the surfaces of the surface-treated steel foil in an amount coated of 5 to 6 g/m². A corona-discharged polypropylene film containing 10% by weight of rutile titanium dioxide incorporated therein and having a thickness of 70 μm was laminated on the surface to be located on the inner face side of a final vessel, and a similar polypropylene film having a thickness of 40 μm was laminated on the surface to be located on the outer face side of the final vessel.

The so-obtained laminate was allowed to stand still at 50° C. for 5 days to cure the adhesive. The adhesive force of the laminate was 1.4 to 1.8 kg/15 mm of width, and the elastic modulus of the adhesive was 7140 kg/cm² as measured at 25° C. The draw-formability was determined as described in (3) above, and a vessel was formed as described in (4) above and shown in FIG. 5 and was evaluated as described in (5) above.

Separately, both the surfaces of a steel foil having a thickness of 40 μm were plated with 2.0 g/m² of nickel in a Watt bath (aqueous solution containing 240 g/l of nickel sulfate, 45 g/l of nickel chloride and 30 g/l of boric acid), and the plated steel foil was cathodically electrolyzed in the above-mentioned electrolytic chromatic treatment bath to form a surface-treated layer comprising 0.05 g/m² of a metallic chromium layer and 15 mg/m² of a chromate layer. An epoxy-phenolic laquer was coated and baked on one surface so that a coating layer having a thickness of 5 μm was formed, and a polypropylene film having a thickness of 50 μm was heat-bonded to the other surface through a maleic anhydride-modified polypropylene layer having a thickness of 10 μm and molten at 200° C. Then, the laminate was cooled for 3 seconds by a cooling roll to obtain a blank for a lid member for the deep-draw-formed vessel. The obtained blank was punched into a disc having a diameter of 75 mm to obtain a heat-sealable lid.

Then, the deep-draw-formed vessel was filled with tuna dressing and the lid was heat-sealed to the vessel. Then, the filled vessel was subjected to retort sterilization at 116° C. for 40 minutes. The evaluation results are shown in Table 1.

EXAMPLE 2

A polyester-epoxy-urethane adhesive (b) was tested and evaluated in the same manner as described in Example 1. The obtained results are shown in Table 1.

EXAMPLE 3

A polyurethane-polyol adhesive (c) was tested and evaluated in the same manner as described in Example 1. The obtained results are shown in Table 1.

COMPARATIVE EXAMPLE 1

A chloroprene type adhesive (d) was tested and evaluated in the same manner as described in Example 1. The obtained results are shown in Table 1.

COMPARATIVE EXAMPLE 2

A polyether-polyurethane adhesive (e) was tested and evaluated in the same manner as described in Example 1. The obtained results are shown in Table 1.

COMPARATIVE EXAMPLE 3

A polyester-polyurethane adhesive (f) was tested and evaluated in the same manner as described in Example 1. The obtained results are shown in Table 1.

COMPARATIVE EXAMPLE 4

An epoxy-polyamide adhesive (g) was tested and evaluated in the same manner as described in Example 1. The obtained results are shown in Table 1.

From the results obtained in Examples 1 through 3 and Comparative Examples 1 through 4, it is seen that in order to obtain a deep-draw-formed vessel excellent in corrosion resistance, shape-retaining property and easy disposability, it is necessary that an adhesive having an adhesive force of at least 600 g/15 mm of width and an elastic modulus of 50 to 10000 kg/cm² should be used.

EXAMPLE 4

A steel foil having a thickness of 75 μm was electrolytically treated in an electrolytic chromate treatment bath (aqueous solution containing 60 g/l of chromic anhydride, 0.2 g/l of sulfuric acid and 0.2 g/l of sodium silicofluoride) to form a surface-treated layer comprising 0.1 g/m² of a metallic chromium layer and 15 mg/m² of a chromate layer on each surface of the steel foil. The polyester-epoxy-urethane adhesive (b) was coated in an amount of 5 to 6 g/m² on both the surfaces. A polypropylene film containing 5% by weight of rutile titanium dioxide incorporated therein and having a thickness of 70 μm was laminated on the surface to be located on the inner face side of a final vessel, and a filler-free polypropylene film having a thickness of 30 μm was laminated on the surface to be located on the outer face side of the final vessel. The obtained laminate was allowed to stand still at 50° C. for 5 days to cure the adhesive. The formed laminate was tested and evaluated in the same manner as described in Example 1. The obtained results are shown in Table 1.

EXAMPLES 5 AND 6

The laminate was tested and evaluated in the same manner as described in Example 4 except that the amount of titanium dioxide incorporated into the film to be located on the inner face side of the final vessel was changed to 10% by weight or 30% by weight and 10% by weight of titanium dioxide was incorporated into the film to be located on the outer face side of the final vessel. The obtained results are shown in Table 1.

COMPARATIVE EXAMPLE 5

The laminate was tested and evaluated in the same manner as described in Example 4 except that filler-free polypropylene films having thicknesses of 70 μm and 30 μm were laminated on the surfaces to be located on the inner and outer face sides of the final vessel, respectively. The obtained results are shown in Table 1.

COMPARATIVE EXAMPLES 6 AND 7

The laminate was tested and evaluated in the same manner as described in Example 4 except that a polypropylene film containing 60% by weight of titanium dioxide and having a thickness of 70 μm or a polypropylene film containing 10% by weight of titanium dioxide and having a thickness of 160 μm was laminated on the surface to be located on the inner face side of the final vessel and a polypropylene film containing 10% by weight of titanium dioxide and having a thickness of 30

μm was laminated on the surface to be located on the outer face side of the final vessel. The obtained results are shown in Table 1.

EXAMPLES 7 THROUGH 9

The laminate was tested and evaluated in the same manner as described in Example 4 except that a polypropylene film containing 10% by weight of titanium dioxide and having a thickness of 40 μm, a polypropylene film containing 10% by weight of titanium dioxide and having a thickness of 70 μm or a medium-density polyethylene film containing 20% by weight of titanium dioxide and having a thickness of 70 μm was laminated on the surface to be located on the inner face side of the final vessel and a polypropylene film containing 10% by weight of titanium dioxide and having a thickness of 40 μm (Example 7) or an undrawn nylon film having a thickness of 40 μm (Examples 8 and 9) was laminated on the surface to be located on the outer face side of the final vessel. The obtained results are shown in Table 1.

EXAMPLE 10

The laminate was tested and evaluated in the same manner as described in Example 4 except that a polypropylene film containing 30% by weight of zinc flower and having a thickness of 70 μm was laminated on the inner face side of the final vessel and a polypropylene film containing 30% by weight of zinc flower and having a thickness of 40 μm was laminated on the surface to be located on the outer face side of the final vessel. The obtained results are shown in Table 1.

EXAMPLE 11

The laminate was tested and evaluated in the same manner as described in Example 4 except that a polypropylene film containing 30% by weight of baryte and having a thickness of 70 μm was laminated on the surface to be located on the inner face side of the final vessel and a polypropylene film containing 30% by weight of baryte and having a thickness of 40 μm was laminated on the surface to be located on the outer face side of the final vessel. The obtained results are shown in Table 1.

TABLE 1

| | Foil | | Surface Treatment | Adhesive | Adhesive Force (g/15 mm of width) | Elastic Modulus (kg/cm$^2$) |
|---|---|---|---|---|---|---|
| | Kind | Thickness (μ) | | | | |
| Example 1 | steel | 75 | chromium/chromate | polyester-urethane adhesive (a) | 1400–1800 | 7140 |
| Example 2 | " | 75 | " | polyester-epoxy-urethane adhesive (b) | 1400–1800 | 2550 |
| Example 3 | " | 75 | " | polyurethane-polyol adhesive (c) | 900–1100 | 1020 |
| Comparative Example 1 | " | 75 | " | chloroprene type adhesive (d) | 850–1000 | 45 |
| Comparative Example 2 | " | 75 | " | polyether-polyurethane adhesive (e) | 450–550 | 2040 |
| Comparative Example 3 | " | 75 | " | polyester-polyurethane adhesive (f) | 550–590 | 1530 |
| Comparative Example 4 | " | 75 | " | epoxy-polyamide adhesive (g) | 950–1100 | 15000 |
| Example 4 | " | 75 | " | polyester-epoxy-urethane adhesive (b) | 1400–1800 | 2550 |
| Example 5 | " | 75 | " | polyester-epoxy-urethane adhesive (b) | " | " |
| Example 6 | " | 75 | " | polyester-epoxy-urethane adhesive (b) | 1000–1400 | " |
| Comparative Example 5 | " | 75 | " | polyester-epoxy-urethane adhesive (b) | 1400–1800 | " |
| Comparative Example 6 | " | 75 | " | polyester-epoxy-urethane adhesive (b) | 900–1000 | " |
| Comparative Example 7 | " | 75 | " | polyester-epoxy-urethane adhesive (b) | 1400–1800 | " |
| Example 7 | " | 75 | " | polyester-epoxy-urethane adhesive (b) | 1400–1500 | " |
| Example 8 | " | 75 | " | polyester-epoxy-urethane adhesive (b) | 1400–1800 | " |
| Example 9 | " | 75 | " | polyester-epoxy-urethane adhesive (b) | 1200–1500 | " |
| Example 10 | " | 75 | " | polyester-epoxy-urethane adhesive (b) | 1200–1500 | " |
| Example 11 | " | 75 | " | polyester-epoxy-urethane adhesive (b) | 1200–1500 | " |

| | Inner Face Side Film | | | | Outer Face Side Film | | | | Evaluation of Draw-Formability | |
|---|---|---|---|---|---|---|---|---|---|---|
| | Resin | | Inorganic Filler | | Resin | | Inorganic Filler | | Critical Draw Ratio | Appearance |
| | Kind | Thickness (μ) | Kind | Amount (wt %) | Kind | Thickness (μ) | Kind | Amount (wt %) | | |
| Example 1 | polypropylene | 70 | TiO$_2$ | 10 | polypropylene | 40 | TiO$_2$ | 10 | 2.3–2.4 | good |
| Example 2 | polypropylene | " | " | " | polypropylene | " | " | " | " | " |
| Example 3 | polypropylene | " | " | " | polypropylene | " | " | " | " | " |
| Comparative Example 1 | polypropylene | " | " | " | polypropylene | " | " | " | 1.9–2.0 | peeling in flange and |

TABLE 1-continued

| | | | | | | | | side wall | |
|---|---|---|---|---|---|---|---|---|---|
| Comparative Example 2 | poly-propylene | " | " | " | poly-propylene | " | " | " | 2.3-2.4 | good |
| Comparative Example 3 | poly-propylene | " | " | " | poly-propylene | " | " | " | 2.3-2.4 | " |
| Comparative Example 4 | poly-propylene | " | " | " | poly-propylene | " | " | " | 2.3-2.4 | " |
| Example 4 | poly-propylene | " | " | 5 | poly-propylene | 30 | not added | — | 2.2-2.3 | " |
| Example 5 | poly-propylene | " | " | 10 | poly-propylene | " | $TiO_2$ | 10 | 2.3-2.4 | " |
| Example 6 | poly-propylene | " | " | 30 | poly-propylene | " | " | " | 2.3-2.4 | " |
| Comparative Example 5 | poly-propylene | " | not added | — | poly-propylene | " | not added | — | 1.9-2.0 | small wrinkles in flange |
| Comparative Example 6 | poly-propylene | " | $TiO_2$ | 60 | poly-propylene | " | $TiO_2$ | 10 | 2.3-2.4 | cracks in inner face side film |
| Comparative Example 7 | poly-propylene | 160 | $TiO_2$ | 10 | poly-propylene | " | " | " | 2.1-2.2 | wrinkles in flange and side wall |
| Example 7 | poly-propylene | 40 | $TiO_2$ | 10 | poly-propylene | 40 | " | " | 2.3-2.4 | good |
| Example 8 | poly-propylene | 70 | $TiO_2$ | " | nylon | " | not added | — | 2.2-2.3 | " |
| Example 9 | poly-ethylene | " | $TiO_2$ | 20 | " | " | " | — | 2.2-2.3 | " |
| Example 10 | poly-propylene | " | zinc flower | 30 | poly-propylene | 40 | zinc flower | 30 | 2.2-2.3 | " |
| Example 11 | poly-propylene | " | baryte | " | poly-propylene | " | baryte | " | 2.2-2.3 | " |

| | Evaluation of Vessel after Retort Sterilization and Evaluation of Corrosion Resistance | | Amount Generated of Hydrogen (ml) |
|---|---|---|---|
| | Appearance after Retort Sterilization | Appearance after 6 Months' Storage at 37° C. | |
| Example 1 | normal | normal | 0.001 |
| Example 2 | " | " | 0.001 |
| Example 3 | " | " | 0.01 |
| Comparative Example 1 | | | |
| Comparative Example 2 | peeling in flange and part of side wall | | |
| Comparative Example 3 | normal | peeling of inner face side film | 0.8 |
| Comparative Example 4 | " | blistering in flange and part of side wall | 0.7 |
| Example 4 | " | normal | 0.001 |
| Example 5 | " | " | 0.001 |
| Example 6 | " | " | 0.001 |
| Comparative Example 5 | " | local rusting | 0.1 |
| Comparative Example 6 | " | rusting | 0.7 |
| Comparative Example 7 | " | peeling and rusting in wrinkled portions | 0.5 |
| Example 7 | " | normal | 0.001 |
| Example 8 | " | " | 0.001 |
| Example 9 | " | " | 0.001 |
| Example 10 | " | slightly dark hue | 0.04 |
| Example 11 | " | " | 0.01 | claim:

1. A deep-draw-formed vessel which is prepared by deep-draw-forming a laminate comprising a steel or iron foil and a plastic film formed on each surface of the steel or iron foil through a layer of an adhesive having an adhesive force of at least 600 g/15 mm of width and an elastic modulus of 50 to 10000 kg/cm².

2. A vessel as set forth in claim 1, wherein the adhesive is a polyester-urethane adhesive or a polyester-epoxy-urethane adhesive.

3. A vessel as set forth in claim 1, wherein the steel or iron foil has a thickness of 10 to 120 μm.

4. A vessel as set forth in claim 1, wherein the laminate comprises a steel foil and said plastic film, wherein the steel foil is a ductile steel foil having a tensile strength of 30 to 50 kg/mm² and an elongation of 15 to 35%.

5. A vessel as set forth in claim 1, wherein the laminate comprises a steel foil and said plastic film, wherein the steel foil is full-hard steel foil having a tensile strength of 40 to 60 kg/mm² and an elongation of 1 to 15%.

6. A vessel as set forth in claim 1, wherein the steel or iron foil has a surface-treated layer comprising a metal plating layer, a chromate layer or both a metal plating layer and a chromate layer.

7. A vessel as set forth in claim 1, wherein the laminate comprises a steel foil in said plastic film, wherein the steel foil is a tin-free steel foil comprising a steel substrate, 0.03 to 0.5 g/m² as Cr of a chromium oxide layer formed on the metallic chromium layer.

8. A vessel as set forth in claim 1, wherein the plastic film has a thickness of 10 to 150 μm.

9. A vessel as set forth in claim 1, wherein the plastic film is a polypropylene film.

10. A vessel as set forth in claim 1, wherein an inorganic filler is incorporated at least in the film layer located on the inner face side of the vessel.

11. A vessel as set forth in claim 10, wherein the inorganic filler is a white inorganic filler having an average particle size of 0.05 to 20 μm, a specific gravity of 2.0 to 9.0 and a hiding power of at least 50 cm$^2$/g as determined according to the method of JIS K-5101.

12. A vessel as set forth in claim 10, wherein the inorganic filler is incorporated in an amount of 2 to 50% by weight based on the resin.

13. A vessel as set forth in claim 10, wherein the inorganic filler is titanium dioxide.

14. A vessel as set forth in claim 1, wherein the laminate is deep-draw-formed so that the draw ratio R defined by the following formula:

$$R = D/d$$

wherein D stands for the diameter of the laminate to be deep-draw-formed and d stands for the diameter of the bottom of the vessel, is 1.5 to 2.4.

15. A deep-draw-formed vessel which is formed from a laminate comprising (A) a steel foil having a thickness of 10 to 120 μm and comprising a steel substrate having on each surface 0.03 to 0.5 g/m$^2$ of a metallic chromium layer and 1 to 50 mg/m$^2$, as Cr, of a chromium oxide layer formed on the metallic chromium layer, (B) inner and outer surface layers composed of a plastic film having a thickness of 10 to 150 μm and comprising a composition comprising polypropylene and 2 to 50% by weight, based on the resin, of titanium dioxide, and (C) adhesive layers interposed between the steel foil and the inner and outer surface layers, which have an adhesive force of at least 600 g/15 mm of width and an elastic modulus of 200 to 9000 kg/cm$^2$, wherein the laminate is deep-draw-formed so that the draw ratio R defined by the following formula:

$$R = D/d$$

wherein D stands for the diameter of the laminate to be deep-draw-formed and d stands for the diameter of the bottom of the vessel, is 1.5 to 2.4.

16. A process for the preparation of deep-draw-formed vessels, which comprises deep-draw-forming a laminate comprising a steel or iron foil and thermoplastic films covering both the surfaces of the steel or iron foil, wherein an inorganic filler is incorporated at least in the film layer to be located on the inner face side of a final vessel.

17. A process according to claim 16, wherein the inorganic filler is incorporated in an amount of 2 to 50% by weight based on the thermoplastic resin.

18. A deep-draw-formed vessel comprising a bottom, a side wall and a flange formed on the top end of the side wall, which is prepared by deep-draw-forming a laminate comprising (a) a steel or iron foil having a thickness of 10 to 120 μm, (b) a plastic film formed on each surface of the steel or iron foil, said film having a thickness of 10 to 150 μm, and (c) an adhesive layer interposed between the steel or iron foil and the plastic film, said adhesive having an adhesive force of at least 600 g/15 mm of width and an elastic modulus of 200 to 9000 kg/cm$^2$.

19. A process for the preparation of deep-draw-formed vessels, which comprises deep-draw-forming a laminate comprising (a) a steel or iron foil having a thickness of 10 to 120 μm, (b) a plastic film formed on each surface of the steel or iron foil, said film having a thickness of 10 to 150 μm, and (c) an adhesive layer interposed between the steel or iron foil and the plastic film, said adhesive having an adhesive force of at least 600 g/15 mm of width and an elastic modulus of 200 to 9000 kg/cm$^2$, wherein an organic filler is incorporated at least in the film layer to be located on the inner face of the final vessel in an amount of 2 to 50% by weight based on the resin.

20. A deep-draw-formed vessel comprising a bottom, a side wall and a flange formed on the top end of the side wall, which is prepared by deep-draw-forming a laminate comprising (a) a steel or iron foil having a thickness of 10 to 120 μm, (b) a plastic film formed on each surface of the steel or iron foil, said film having a thickness of 10 to 150 μm and containing an inorganic filler dispersed therein in an amount of 2 to 50% by weight based on the resin, and (c) an adhesive layer interposed between the steel or iron foil and the plastic film, said adhesive having an adhesive force of at least 600 g/15 mm of width and an elastic modulus of 200 to 9000 kg/cm$^2$.

21. A vessel as set forth in claim 1 wherein the steel or iron foil has a thickness of 30 to 100 μm and the plastic film formed on each surface of the steel or iron foil has a thickness of from 30 to 100 μm.

22. A vessel as set forth in claim 1 wherein the plastic film is a film of a resin selected from the group consisting of polyolefins, polyamides, polyesters, polycarbonates, vinyl chloride resins, vinylidene chloride resins, high-nitrile resins and polystyrene resins.

* * * * *